United States Patent
Barriendos et al.

(10) Patent No.: US 6,314,984 B1
(45) Date of Patent: Nov. 13, 2001

(54) PREFERRED VALVE STOPS WITH CUSHIONS

(75) Inventors: Manuel Lucea Barriendos; Miguel Angel Hidalgo Arribas, both of Saragossa (ES)

(73) Assignee: Casa Artiach S.A., Saragossa (ES)

( * ) Notice: Subject to any disclaimer, the term of this patent is extended or adjusted under 35 U.S.C. 154(b) by 0 days.

(21) Appl. No.: 09/632,432

(22) Filed: Aug. 4, 2000

(30) Foreign Application Priority Data

Aug. 5, 1999 (ES) .................................................. 9902093

(51) Int. Cl.[7] .................................................. F16K 15/20
(52) U.S. Cl. .......................... 137/223; 446/224; 251/351
(58) Field of Search .................. 137/223; 446/220, 446/224; 220/714; 251/82, 346, 347, 341, 351

(56) References Cited

U.S. PATENT DOCUMENTS

| | | | | |
|---|---|---|---|---|
| 1,264,718 | * | 4/1918 | Wagner | 251/351 |
| 2,084,872 | * | 6/1937 | Seashore | 251/351 |
| 2,824,570 | * | 2/1958 | Silverman et al. | 137/223 |
| 2,887,120 | * | 5/1959 | De See | 137/223 |
| 2,977,973 | * | 4/1961 | Chakine | 137/223 |
| 3,995,653 | * | 12/1976 | Mackal et al. | 137/234 |
| 5,119,842 | * | 6/1992 | Jaw | 137/232 |
| 5,121,840 | * | 6/1992 | Schram | 206/522 |
| 5,343,889 | * | 9/1994 | Jaw | 137/232 |
| 5,351,711 | * | 10/1994 | Peter | 137/232 |
| 5,556,008 | * | 9/1996 | Silver et al. | 222/192 |
| 5,722,451 | * | 3/1998 | Godeau et al. | 137/315 |
| 5,785,076 | * | 7/1998 | You | 137/231 |
| 5,791,510 | * | 8/1998 | Paczonay | 220/714 |
| 5,911,406 | * | 6/1999 | Winefordner et al. | 251/339 |
| 6,032,831 | * | 3/2000 | Gardner et al. | 222/175 |
| 6,053,475 | * | 4/2000 | Batschied et al. | 251/351 |
| 6,203,246 | * | 3/2001 | Courtney et al. | 405/185 |

* cited by examiner

Primary Examiner—John Rivell
Assistant Examiner—Meredith H. Schoenfeld

(57) ABSTRACT

Improved valve for cushions, of the type including a nipple threadable on a tubular body, the nipple showing a diaphragm or choking disc of an existing seat or toric joint on the end of the tube, the disc being joined to the nipple by a series of brackets separated from each other by windows, characterized because the nipple has an entering stepped surrounding up to the upper part where a rotary skirt is lodged with a truncated cone or cylindrical shape, supported by an inner rib in the part of the skirt and is lodged in an existing crack at the bottom of the stepped existing at the nipple.

Figure 1:
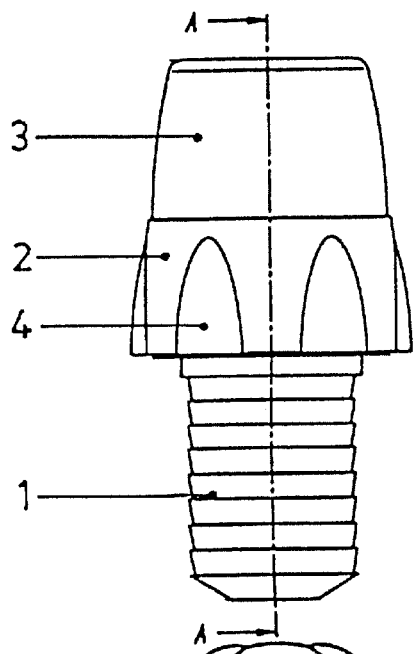

2 Claims, 1 Drawing Sheet cross section A-A cross section A-A

PREFERRED VALVE STOPS WITH CUSHIONS

This Utility Model application has the purpose of registering an improved valve for cushions incorporating significant innovations and advantages compared to the present valves or similar devices for such purpose.

In fact, a valve has been conceived that eases cushions inflation and other inflatable items, not causing any physical damage to the user's lips during the handling of said valve.

INVENTION BACKGROUND

At present, many inflatable items available have valves to be inflated by blowing on the part of the user. The main types of valves consist of a neck that has a pressure plug attached, but which are annoying to be handled, and lose part of the air when proceeding with closing them. Other improved valves consist of two elements threaded one over the other. The mobile element, applied to the lips of the user, usually has an adapted cylindrical or truncated cone shape, having a series of offsets or longitudinal ribs in their handling surface. Said nipple is threaded on a tubular part fastened to the cushion and when a part is threaded or unthreaded over the other compression or decompression is produced of a toric joint or any other device obstructing the air passage, thus obtaining the air tightness of the air chamber. Said offsets cause frictions and injuries to the users' lips when inflating the cushion, since to close the valve the turning of the nozzle must be done with the lips still applied.

INVENTION DESCRIPTION

The improved valve for cushions purpose of this registration, is characterized because it is constituted by a device to inflate cushions and inflatable items, easy handling, preventing the loss of air during the inflation of the cushion and that does not cause any damage to the user's lips.

The valve of the new invention consists of a tube part of the cushion and which has a thread in the upper part of the nipple. Said nipple is constituted by a threadeable part on said fixed tube and a free rotary upper skirt, suitable for the user to apply his lips on it. The threadable part of the nipple shows in its inside a series of brackets in a radial arrangement and separated from each other, forming a series of intermediate windows. Said brackets are jointed in their confluent end with a cross section disc that will constitute a choking diaphragm of the valve. Actually, when the nipple is threaded on the tube, the diaphragm is applied on a seat formed at its outlet, or toric joint, blocking the air passage. When the nipple is unthreaded, the diaphragm is separated in said seat, allowing the air passage between the outside and inside of the cushion or similar item, through the windows between the brackets. During this nipple threading and unthreading process, the rotary movement is not transmitted to the user's lips, since the skirt where they are applied to slide over the mentioned nipple.

To complete the description that will be given below, and with the purpose of aiding to better understand its characteristics, this descriptive summary is attached, with a set of drawings with figures, where the more significant details of the invention are shown, in an informative and not limiting manner.

BRIEF DESCRIPTION OF THE DESIGNS

FIG. 1. Shows a top view of the valve.

Figure 2:
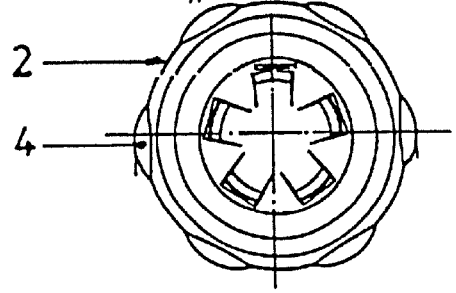

FIG. 2. Shows a view of the valve layout.

Figure 3:
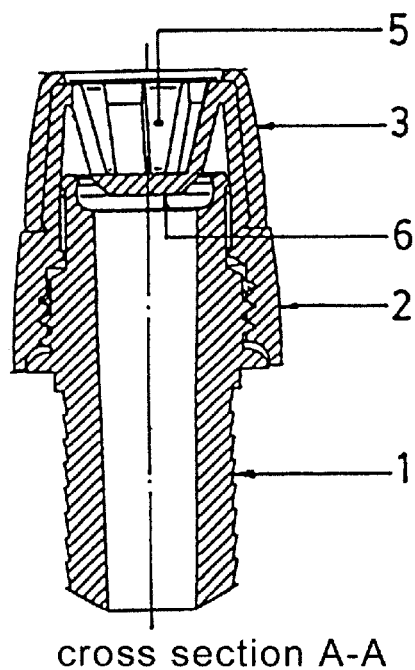

FIG. 3. Shows a view of top sections of the valve.

Figure 4:
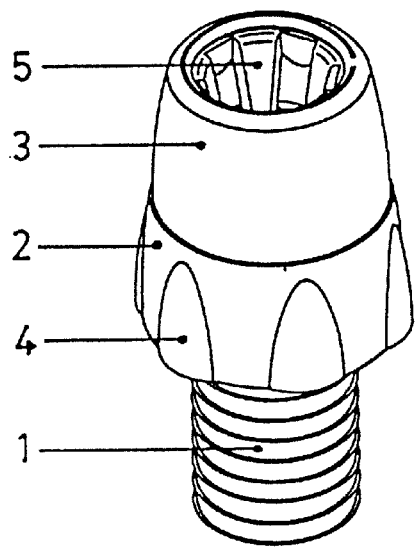

FIG. 4. Shows a view in a perspective outlook of the valve.

DESCRIPTION OF A PREFERRED CREATION

Referring to the figures and according to the numbering adopted, a preferred but not limiting embodiment of the invention consists of a nipple (2) in a truncated pyramid shape showing that a rotary skirt (3) is overlaying on its upper portion, lodged in a surrounding stepped entrance, supported by a surrounding rib existing in the internal lower face of said skirt (3) and supported at the stepped entrance of the nipple (2), and the nipple surface exist by a series of longitudinal offsets (4) extended up to its base. In the inside of the nipple (2) a series of brackets (5) are found supported on the upper open outlet and joined together by a diaphragm (6) or lower cross section disc. Said nipple (2) in its inner part shows a threaded spiral suitable to be received by another threading spiral existing in the tube (1) or valve body. Said body (1), having a tubular shape and exhibiting a top peripheral offset, behind which a series of inclined grooves are found. Between the threads and the upper end of the body (1) a re-sunk area is found, suitable to lodge a surrounding of the nipple (2), displaceable in all its length.

What is claimed is:

1. A valve for inflating cushions comprising:
   a valve body, the valve body having a user's end and a cushion end, the user's end exhibiting a freely rotating skirt; and
   a rotary valve control positioned between the cushion end and the freely rotating skirt, the rotary valve control alternatingly engaging a valve.

2. The valve of claim 1 in which freely rotating shirt exhibits a smooth exterior surface and the rotary valve control exhibits a plurality of off-sets in its exterior surface.

* * * * *